United States Patent [19]

Holmquist

[11] 4,294,781
[45] Oct. 13, 1981

[54] APPARATUS FOR WASHING GASES AND/OR RECOVERING HEAT THEREFROM

[75] Inventor: Börje G. A. Holmquist, Solna, Sweden

[73] Assignee: Leitex Stockholms-Tvatt Aktiebolag, Solna, Sweden

[21] Appl. No.: 114,381

[22] Filed: Jan. 22, 1980

[51] Int. Cl.³ .............................................. B01D 47/16
[52] U.S. Cl. .................................... 261/89; 55/230; 261/110
[58] Field of Search ................... 55/91, 92, 93, 94, 86, 55/230, 231; 261/83, 84, 89, 88, 110; 239/223, 224

[56] References Cited

U.S. PATENT DOCUMENTS

| | | | |
|---|---|---|---|
| 679,587 | 7/1901 | Zellweger | 261/84 |
| 1,378,716 | 5/1921 | Nielson et al. | 261/88 |
| 1,759,629 | 5/1930 | Riley | 239/223 |
| 2,969,851 | 1/1961 | Preeman | 55/238 |
| 3,044,441 | 7/1962 | Blakeslee et al. | 239/223 |

FOREIGN PATENT DOCUMENTS

| | | | |
|---|---|---|---|
| 23164Ad. | of 1903 | United Kingdom | 261/89 |
| 194520 | 3/1923 | United Kingdom | 261/89 |
| 589033 | 7/1978 | U.S.S.R. | 239/223 |

*Primary Examiner*—Bernard Nozick
*Attorney, Agent, or Firm*—Fred Philpitt

[57] ABSTRACT

An apparatus for washing gases and/or recovering heat therefrom, which apparatus includes a cylindrical treatment vessel (1) having at the bottom thereof a gas inlet (3) connected to a gas supply line (2) and at the top thereof a gas outlet (4) for processed gas; a vertical rotatable center shaft (5) which carries at least one cup-shaped rotary body (6) having a plurality of openings (7), preferably vertical slots, in the side wall (8) thereof; respective means (9, 10) cooperating with each of said rotary bodies (6) for introducing liquid to at least one location within said at least one rotary body (6); and a liquid outlet (11) at the bottom of the vessel. The liquid introduced into the rotary body or bodies (6) is thrown as curtains of liquid through the openings (7) against the walls of the treatment vessel by rotating the rotary body or bodies (6). The gas is conveyed past the rotary body or bodies (6) on the outside thereof in a space between the rotary body or bodies (6) and the wall of the vessel to flow substantially upwardly along said wall and the outside of the rotary body or bodies and transversely relative to the direction of flow of the curtains of liquid issuing from the rotary body or bodies (6).

7 Claims, 1 Drawing Figure

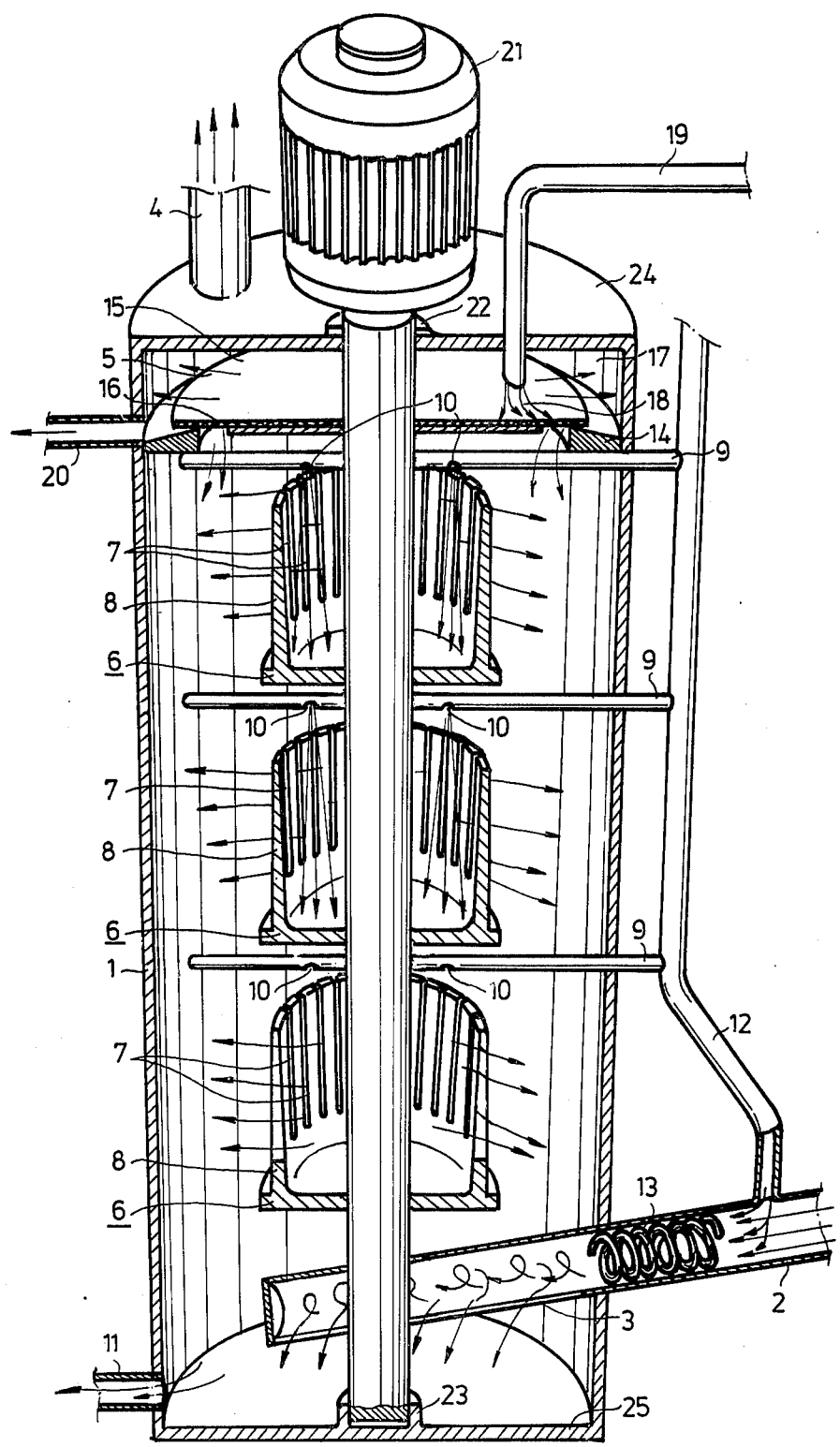

APPARATUS FOR WASHING GASES AND/OR RECOVERING HEAT THEREFROM

The present invention relates to an apparatus for washing gases and/or recovering heat therefrom.

It is known to process gases for the above purpose, by passing the gas through a treatment vessel from the bottom thereof and discharging said gas from the top thereof, and using for said process a liquid which is atomized or finely divided in the treatment vessel and collected and discharged from the bottom of the vessel. In this respect the treatment vessel has had the form of a spray tower, in which the liquid is finely divided or atomized by means of one or more spray nozzles. One disadvantage with this known method, however, is that the nozzles are quickly blocked by impurities or solid foreign matter in the liquid and/or gas.

This disadvantage is avoided with the apparatus according to the invention. Thus, the apparatus is insensitive to the presence of solid impurities in both the gas and the liquid and enable various kinds of waste water to be used to process said gas.

A further advantage afforded by the invention is the low pressure-drop obtained in the vessel.

The apparatus according to the invention is characterized by introducing the liquid into one or more cup-shaped rotary bodies which are mounted on a vertical centre shaft arranged in the treatment vessel with a space between the rotary body or bodies and the vessel wall, and which is or are provided in the respective side wall thereof with a plurality of openings, such as to form during rotation of said body or bodies curtains of liquid which flow freely from said body or bodies out towards the walls of said treatment vessel, said openings preferably having the form of vertically extending slots; and in that the gas is lead past the rotary body or bodies on the outside thereof in the space between said body or bodies and the wall of said vessel, to flow substantially upwardly along the vessel wall and the outside of the rotary body or bodies and transversely relative to the direction of flow of the curtains of liquid issuing from the rotary body or bodies.

In accordance with a preferred embodiment of the apparatus according to the invention, resulting in a low temperature of the outgoing gas, the gas after it has passed the curtains of liquid issuing from the rotary bodies, is cooled in an upper part of the treatment vessel with a cooling liquid, said upper part of said vessel being defined by a ring segment and a circular disc of porous material mounted on said vertical shaft above said ring segment, said cooling liquid being directed onto the upper side of said circular disc.

It may also be to advantage to cool the gas prior to its introduction into the treatment vessel by injecting liquid into the line through which the gas is charged to the treatment vessel.

The apparatus according to the invention is characterized in that it includes a cylindrical treatment vessel having at the bottom thereof a gas inlet connected to a gas supply line and at the top thereof a gas outlet for processed gas; a vertical rotatable centre shaft which carries at least one cup-shaped rotary body having a plurality of openings, preferably vertical slots, in the side wall thereof; respective means cooperating with each of said rotary bodies for introducing liquid to at least one location within said at least one rotary body; and a liquid outlet at the bottom of the vessel; and in that the gas is arranged to flow past the at least one rotary body on the outside thereof in a space located between said at least one body and the wall of said vessel and substantially upwardly along said vessel wall and the outside of said rotary body; and that the liquid is arranged to be thrown out freely through the openings in the side wall of said at least one rotary body, out towards the wall of said vessel.

According to a preferred embodiment of said rotary body, its internal diameter is greater at the upper edge thereof than at its bottom, whereby solid impurities, such as fibres entrained with the liquid, do not collect within the body, but are moved up the inner wall of said body and out over the rim thereof.

From another aspect, the side wall of respective rotary bodies preferably has a substantially vertical outer surface.

In a preferred embodiment of the apparatus according to the invention a ring-shaped segment arranged on the inside of the treatment vessel defines, together with a circular disc of porous material mounted on said vertical shaft above said segment, an upper part of the treatment vessel; and a liquid inlet is directed against the upper side of said disc. Preferably, the upper surface of the ring-shaped segment slopes down towards the wall of the vessel. Further advantages are afforded by the provision of a liquid outlet in the wall of the vessel, immediately above said ring-shaped segment.

In accordance with a further embodiment, the gas-supply line is connected externally of the treatment vessel to a liquid-supply line.

An exemplary embodiment of the invention will now be described with reference to the accompanying drawing, the single FIGURE of which is a sectional view of an apparatus constructed in accordance with the invention.

The illustrated apparatus comprises a cylindrical treatment vessel 1 having arranged at the bottom thereof a gas-supply line 2 having extending therealong a gas inlet in the form of a slot 3, and at the top thereof a gas outlet 4 through which gas processed in the vessel 1 departs therefrom. The apparatus further includes a vertical, rotatable centre shaft 5 which carries a plurality of cup-shaped rotary bodies 6, each of which is provided in its side wall 8 with a plurality of slot-like openings 7; and a liquid-supply line 9 arranged for each rotary body and having two openings 10, which are so located that liquid is sprayed into respective rotary bodies 6. A liquid-outlet line 11 is arranged at the bottom of the vessel 1. Connected to the gas-supply line 2 externally of the vessel 1 is a liquid-supply line 12, which simultaneously serves as a main supply line for the lines 9. A coil 13 is arranged in the gas-supply line 2, to ensure that the liquid passing through the line 12 is mixed with the gas passing through said line 2.

In the illustrated embodiment, a ring-shaped segment 14 is mounted on the inside of the vessel 1. The upper surface of the segment 14 slopes down towards the wall of the vessel 1. The segment 14 defines an upper part of the vessel 1 together with a circular disc 15 of porous material, such as a textile material, mounted on the shaft 5 and supported by a further circular disc 16 of rigid material also mounted on the shaft 5. An outlet 18 from a liquid-supply line 19 is directed onto the porous disc 15. An outlet 20 for said liquid is provided adjacent the segment 14.

The shaft 5 is journalled on bearings 22, 23 in respective end walls of the vessel 1, and is driven by a motor 21.

The outer surfaces of the walls 8 of the bodies 6 are substantially vertical, while the inner surfaces slope inwardly, so that the bodies have a greater inner diameter at the top than at the bottom.

The gas to be processed and passing through the line 2 is cooled by means of liquid entering through the line 12 connected to the line 2. The mixture of gas and liquid flows into the vessel 1 through the slot 3. Subsequent to entering said vessel, the gas flows upwardly therethrough and during its passage is forced to pass through a plurality of curtains of liquid. These liquid curtains are generated by spraying or injecting liquid issuing from the line 9 and openings 10 into the rotary bodies 6, and by rotating said bodies at such speeds that the liquid is thrown through the slots 7 in respective side walls 8, out towards the inside of the vessel 1. The gas then passes into the upper part 17 of the vessel 1, subsequent to having first passed a further curtain of liquid, said further liquid curtain being generated by causing liquid issuing from the line 19 and inlet 18 to be thrown out towards the inside of the vessel 1 by the disc 15.

The liquid introduced through the lines 12 and 9 collects at the bottom of the vessel and is discharged therefrom through the outlet 11. An advantage can be gained by returning a major part of the liquid leaving through outlet 11 to the lines 12 and 9, and to conduct the remainder of said liquid to a working-up station, where the amount of liquid delivered to said lines 12 and 9 can be made up by adding fresh, cold liquid. If the gas in line 2 is to be strongly cooled, separate lines are suitably used for the liquid-supply line connected to the gas-supply line 2, and the main supply line for the lines 9; in which case fresh, cold liquid is supplied to the connecting liquid-supply line, while liquid taken from the outlet 11 is returned to the lines 9.

The liquid supplied to the line 19 and the inlet 18 preferably has a low temperature, such that the temperature of the exiting gas is also low and only a small amount of condensation is formed in said gas. The inlet 18 is preferably directed onto a location on the disc 15 adjacent the shaft 5. Although a major part of the liquid entering the vessel through line 19 leaves through the outlet 20, a minor amount may spill over the edge of the segment 14 and run down to the lower part of the vessel 1, this minor amount depending upon the amount of liquid charged to the vessel through line 19 and the dimensions of the outlet 20. If desired, the outlet 20 may be omitted, so that all the liquid entering the vessel through line 19 runs down to the bottom of the vessel 1. Another possible variant is to provide means whereby the flow of liquid from the outlet 20 can be joined with the flow of liquid from the outlet 11.

Because the inner walls of the rotary bodies 6 slope inwardly, solid matter accompanying the liquid in the lines 9 is moved by centrifugal force up the side walls 8 of said bodies, and out over the rims thereof. The slot-like shape of the openings also enable fibrous contaminents to be carried away in this manner. When the liquid used is not expected to have fibres therein, or only extremely small fibres, the openings 7 may have a different form to that illustrated. Through the combination of a vertical outer surface of the walls 8, and vertical elongate slots 7, the liquid is thrown out through the openings in the form of sheets or layers having a considerable thickness, thereby ensuring good contact between liquid and gas. It is, however, also possible for said openings 7 and the outer surface of said wall 8 to have different forms to those illustrated and described so as to obtain special effects, without departing from the scope of the invention.

The amount of liquid in the lines 9 should be such as to ensure that the liquid reaches as far up the wall 8 of respective bodies 6 as possible, so that the thickness of the ensuing sheets or layers of liquid is as great as possible.

The shaft 5 shall be rotated in a manner such that liquid in the bodies 6 is thrown out into the vessel 1. A peripheral speed of the rotary bodies 6 in the order of magnitude of 10–20 m/s should be sufficient in this respect. Very high speeds result in the formation of mists, and therewith lower efficiencies. The optional rotary speed of said bodies for given glows of liquid and gas can be established by simple tests.

The number of rotary bodies 6 and openings 7 in the side walls thereof can be varied, without departing from the scope of the invention. Although the efficiency of the apparatus will increase with increasing numbers of rotary bodies and openings, this increase will be only minimal when said number of rotary bodies and openings exceeds a certain value. Further, it is conceivable to provide a further cooling stage of the kind arranged in the upper part of the vessel in the illustrated embodiment, or by providing such a stage between two rotary bodies 6, or as an initial cooling stage.

Very high efficiencies have been obtained with a prototype apparatus constructed according to the invention, both with respect to purifying a gas and to removing heat therefrom.

What is claimed is:

1. An apparatus for washing gases and/or recovering heat therefrom, wherein said apparatus includes a cylindrical treatment vessel having at the bottom thereof a gas inlet connected to a gas supply line and at the top thereof a gas outlet for processed gas; a vertical rotatable centre shaft which carries at least one cup-shaped rotary body having a plurality of openings in the form of slots in the side wall thereof; respective means cooperating with said at least one rotary body for introducing liquid to at least one location within said at least one rotary body; and a liquid outlet at the bottom of the vessel; and said vessel also having an upper part defined by a ring-shaped segment, arranged on the inside of said vessel, and a circular disc of porous material mounted on the shaft above said ring-shaped segment; a liquid inlet being directed onto the upper surface of the disc; and in which vessel the gas is arranged to flow past the at least one rotary body on the outside thereof in a space located between said at least one body and the wall of said vessel and substantially upwardly along said vessel wall and the outside of said rotary body; and in which vessel the liquid is arranged to be thrown out freely through the openings in the side wall of said at least one rotary body, out towards the wall of said vessel.

2. An apparatus according to claim 1, wherein said slots are vertically extending slots.

3. An apparatus according to claim 1, wherein the gas-supply line has a liquid-supply line connected thereto externally of the vessel.

4. An apparatus according to claim 1, wherein each rotary body has a greater diameter at the top thereof than at the bottom thereof.

5. An apparatus according to claim 4, wherein the outer surface of the side wall of each rotary body is substantially vertical.

6. An apparatus according to claim 1, wherein the ring-shaped segment slopes downwardly towards the wall of the vessel.

7. An apparatus according to claim 6, wherein a liquid outlet is arranged in the wall of the vessel, immediately above the ring-shaped segment.

* * * * *